(12) United States Patent
Jin et al.

(10) Patent No.: US 11,122,201 B2
(45) Date of Patent: Sep. 14, 2021

(54) IMAGING APPARATUS

(71) Applicant: HANWHA TECHWIN CO., LTD., Seongnam-si (KR)

(72) Inventors: Jong Man Jin, Seongnam-si (KR); Jong Kyung Lee, Seongnam-si (KR); Eun Soo Choi, Seongnam-si (KR)

(73) Assignee: HANWHA TECHWIN CO., LTD., Suwon-si (KR)

( * ) Notice: Subject to any disclaimer, the term of this patent is extended or adjusted under 35 U.S.C. 154(b) by 24 days.

(21) Appl. No.: 16/679,857

(22) Filed: Nov. 11, 2019

(65) Prior Publication Data

US 2020/0162672 A1 May 21, 2020

(30) Foreign Application Priority Data

Nov. 16, 2018 (KR) .................. 10-2018-0141966

(51) Int. Cl.
*H04N 5/232* (2006.01)
*H04N 5/247* (2006.01)
*H04N 5/225* (2006.01)

(52) U.S. Cl.
CPC ....... *H04N 5/23238* (2013.01); *H04N 5/2252* (2013.01); *H04N 5/247* (2013.01)

(58) Field of Classification Search
CPC ... H04N 5/23238; H04N 5/2252; H04N 5/247
USPC ........................................... 348/218.1
See application file for complete search history.

(56) References Cited

U.S. PATENT DOCUMENTS

2016/0191813 A1* 6/2016 Wu .............. H04N 5/2252
                                                        348/159

FOREIGN PATENT DOCUMENTS

| JP | 4052547 B2 | 2/2008 |
|---|---|---|
| JP | 2014-82768 A | 5/2014 |
| JP | 2016-90626 A | 5/2016 |
| KR | 10-0711570 B1 | 4/2007 |
| KR | 10-0724164 B1 | 5/2007 |
| KR | 10-1125374 B1 | 3/2012 |

* cited by examiner

*Primary Examiner* — Joel W Fosselman
(74) *Attorney, Agent, or Firm* — Sughrue Mion, PLLC

(57) ABSTRACT

An imaging apparatus includes: a frame; and at least one camera provided on the frame, wherein the at least one camera includes: a lens; a sensor coupled to the lens and configured to obtain an image; a base coupled to the sensor, configured to receive external power, and rotatable on the frame; and a guide connected to the base to be rotatable along with the base, and contacting the frame.

20 Claims, 11 Drawing Sheets

IMAGING APPARATUS

CROSS-REFERENCE TO THE RELATED APPLICATION

This application claims priority from Korean Patent Application No. 10-2018-0141966, filed on Nov. 16, 2018, in the Korean Intellectual Property Office, the disclosure of which is incorporated herein in its entirety by reference.

BACKGROUND

1. Field

Apparatuses and methods consistent with exemplary embodiments of the inventive concept relate to changing a photographing mode and improving position representation and stitching performance when a mode changes in an imaging apparatus such as camera.

2. Description of Related Art

In general, a surveillance camera is installed in a predetermined region and uses at least one camera lens to monitor the front side or the back, or both the front and the back of the surveillance camera. When a plurality of camera lenses are used, images captured by the plurality of camera lenses are output respectively or as a panoramic image to a monitor through a signal converter and an image editor to perform a monitoring operation.

When a plurality of lenses are provided in a single imaging apparatus, although an aspect ratio of each lens is 4:3 or 16:9, the lens is fixed and only one of a horizontal image and a vertical image is viewed, and thus, a horizontally or vertically large area may not be selectively monitored according to a purpose in a region where the single imaging apparatus is installed.

SUMMARY

The objective of one or more embodiments is to improve position representation and stitching performance during change of a photographing mode because a guide of an imaging apparatus may be able to prevent a central axis of rotation from being moved when a base of the imaging apparatus to which a lens and a sensor are attached rotates.

However, the above problem is merely an example and does not limit the scope of the inventive concept.

Various aspects of embodiments will be set forth in part in the description which follows and, in part, will be apparent from the description, or may be learned by practice of the presented embodiments.

According to an aspect of one or more embodiments, there is provided an imaging apparatus which may include: a frame; and at least one camera provided on the frame, wherein the at least one camera may include: a lens; a sensor coupled to the lens and configured to obtain an image; a base coupled to the sensor, configured to receive external power, and rotatable on the frame; and a guide connected to the base to be rotatable along with the base, and contacting the frame.

The base may be rotatable within a preset angle about a central axis of rotation, and as the base rotates, the sensor and the lens may rotate and a photographing mode may change between a plurality of different modes which may include a first mode, in which a horizontal length of the image is greater than a vertical length of the image, and a second mode in which the horizontal length of the image is smaller than the vertical length of the image.

The imaging apparatus may further includes an elastic member including an elastic material and coupled to each of the frame and the guide. The elastic member may include a torsion spring having a coil shape.

A protrusion may protrude from an outer circumferential surface of the guide, wherein the elastic member is caught by the protrusion.

The guide may include: a guide body sharing the central axis of rotation with the base and connected to the base; and a guide contact coupled to an outer surface of the guide body to protrude outward and contacting the frame.

The guide may further include a guide well coupled to an outer surface of the base.

The imaging apparatus may further include a support located between the based and the frame and contacting the based and the frame.

The support member may include: a support plate located between the base and the frame; and a bearing provided on the support plate and contacting the base and the frame. The bearing member may include a ball bearing. One side of the bearing may be in point contact with a surface of the base, and the other side of the bearing may be in point contact with a surface of the frame.

According to another aspect of one or more embodiments, there is provided an imaging apparatus which may include: a frame; and a plurality of cameras provided on the frame, wherein each of the cameras may include: a lens; a sensor coupled to the lens and configured to obtain an image; and a base to which the sensor or the lens is coupled, wherein the base is configured to rotate on the frame by a preset angle to change a photographing mode between a plurality of different modes in which an aspect ratio of the sensor is different. Here, the images captured by the sensors of the plurality of cameras may form a panoramic image.

Other features and advantages will become more apparent from the drawings, the claims, and the detailed description herebelow.

BRIEF DESCRIPTION OF THE DRAWINGS

The above and other aspects, features, and advantages of the embodiments of the inventive concept will be more apparent from the following description taken in conjunction with the accompanying drawings, in which.

DETAILED DESCRIPTION

Figure 1:
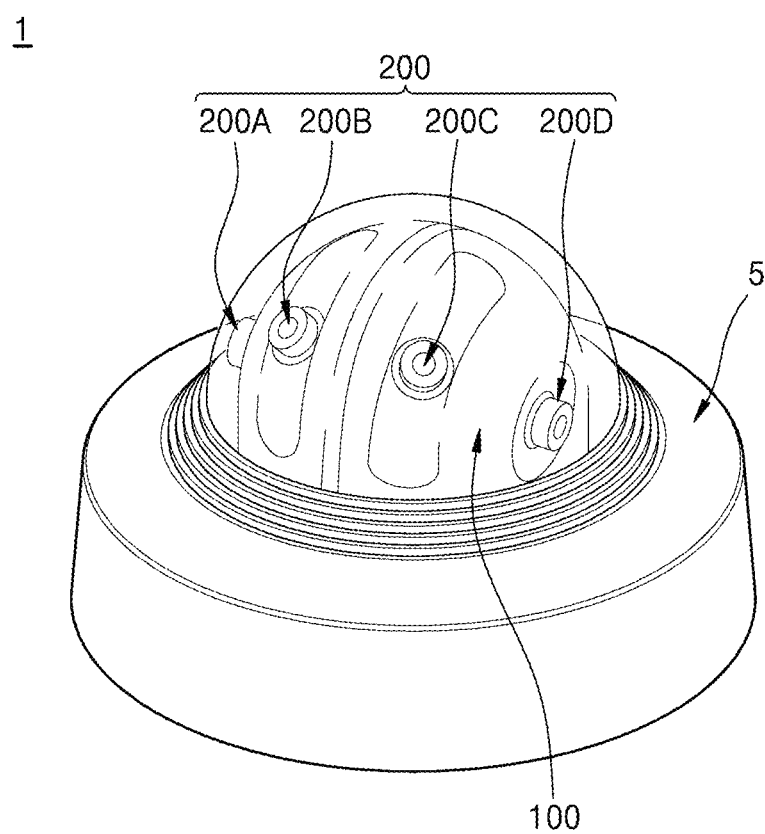
FIG. 1 is a perspective view of an imaging apparatus according to an embodiment.

Reference will now be made in detail to embodiments which are illustrated in reference to the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. The embodiment described herein are all exemplary.

It will be understood that although the terms "first", "second", etc. may be used herein to describe various components, these components should not be limited by these terms, are only used to distinguish one component from another. As used herein, the singular forms "a", "an", and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of components in the drawings may be exaggerated for convenience of explanation. For example, because sizes and shapes of components in the drawings are arbitrarily illustrated for convenience of explanation, the present disclosure is not limited thereto.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout. As used herein, the term "and/or" includes any and all combinations of one or more of the associated listed items.

Spatially relative terms, such as "beneath," "below," "lower," "over," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Figure 2:
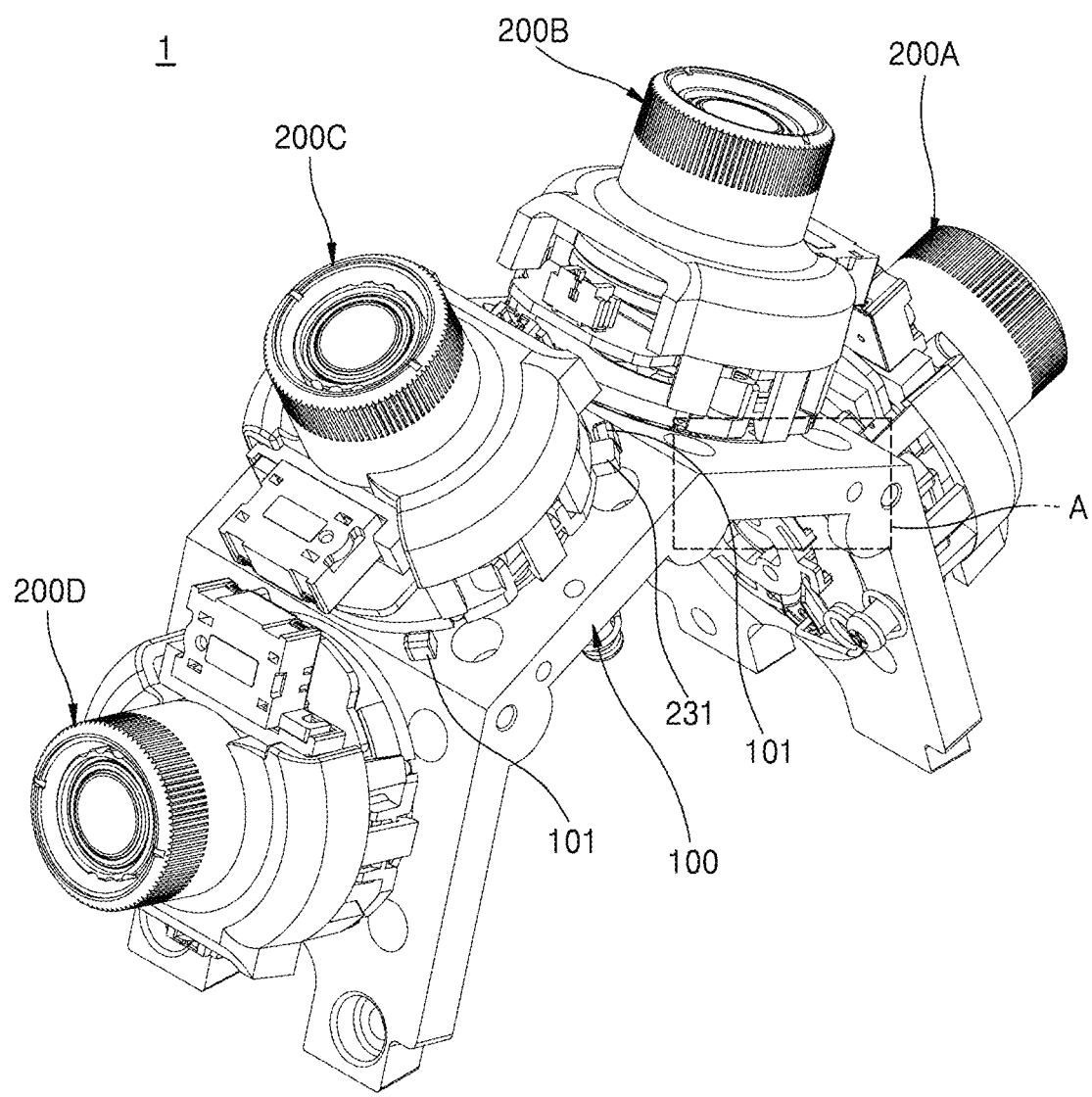
FIGS. 2 and 3 are perspective views illustrating a frame and a plurality of cameras according to an embodiment.
Figure 3:
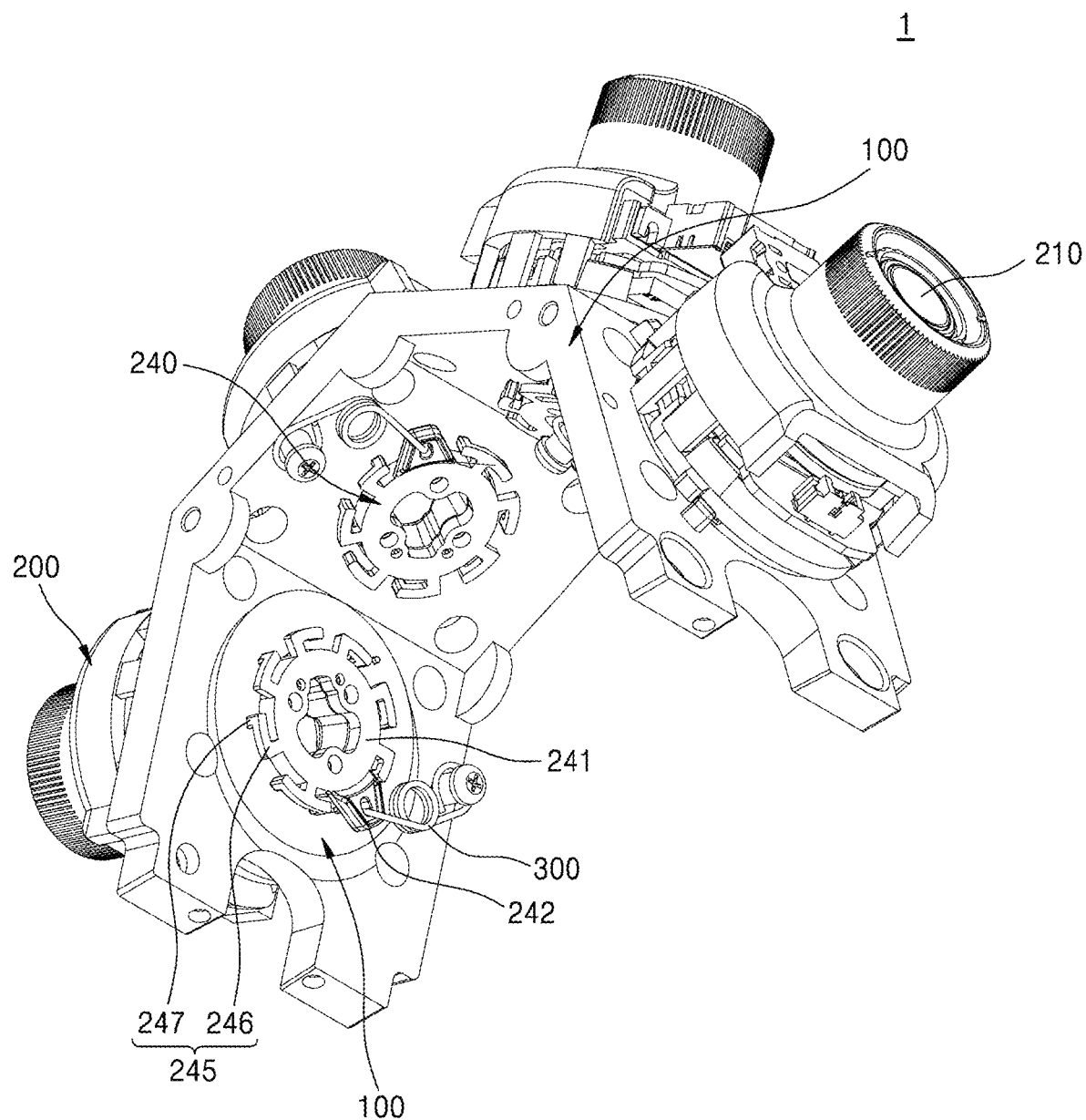
Figure 4:
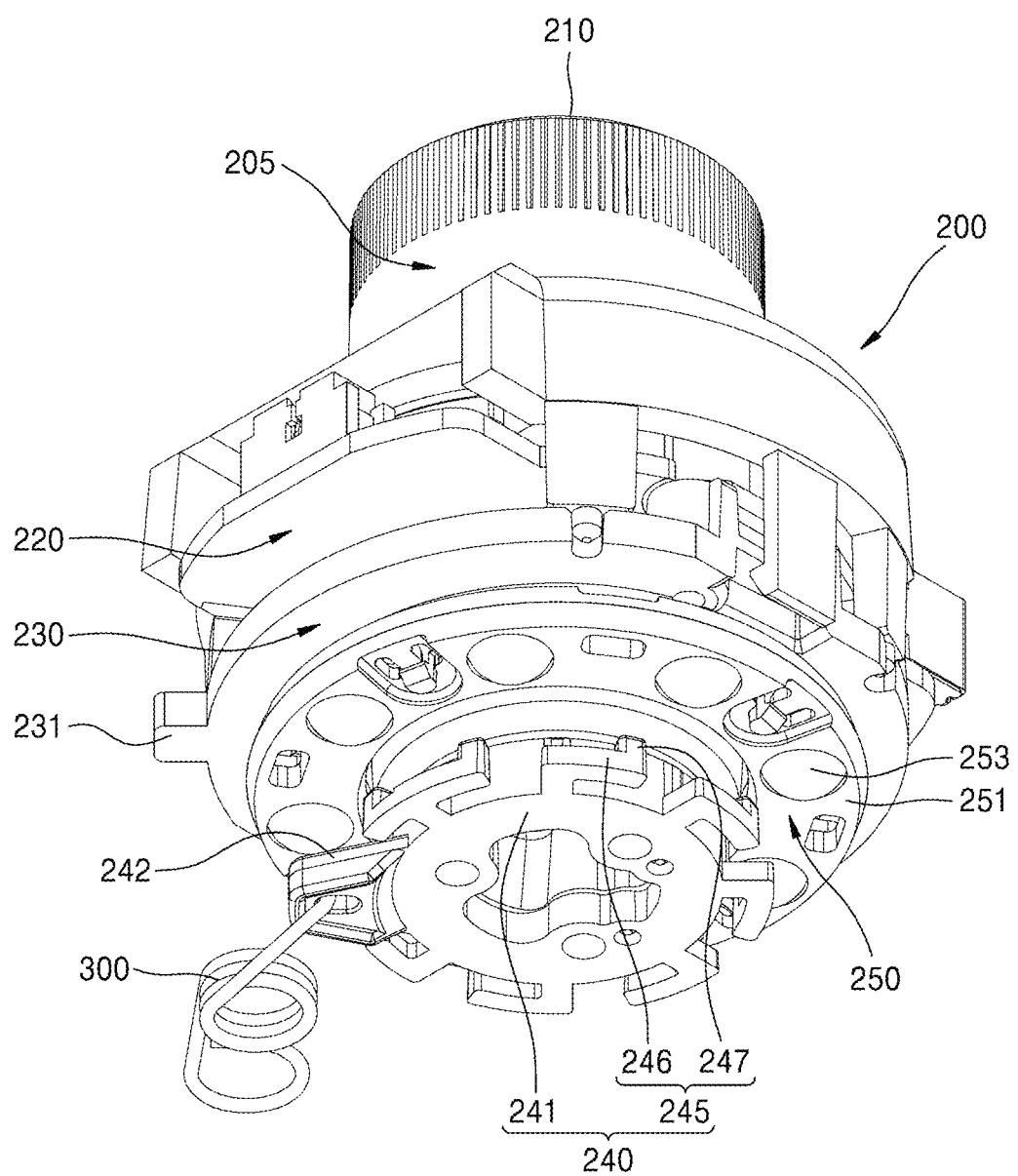
FIG. 4 is a perspective view illustrating the camera according to an embodiment.
Figure 5:
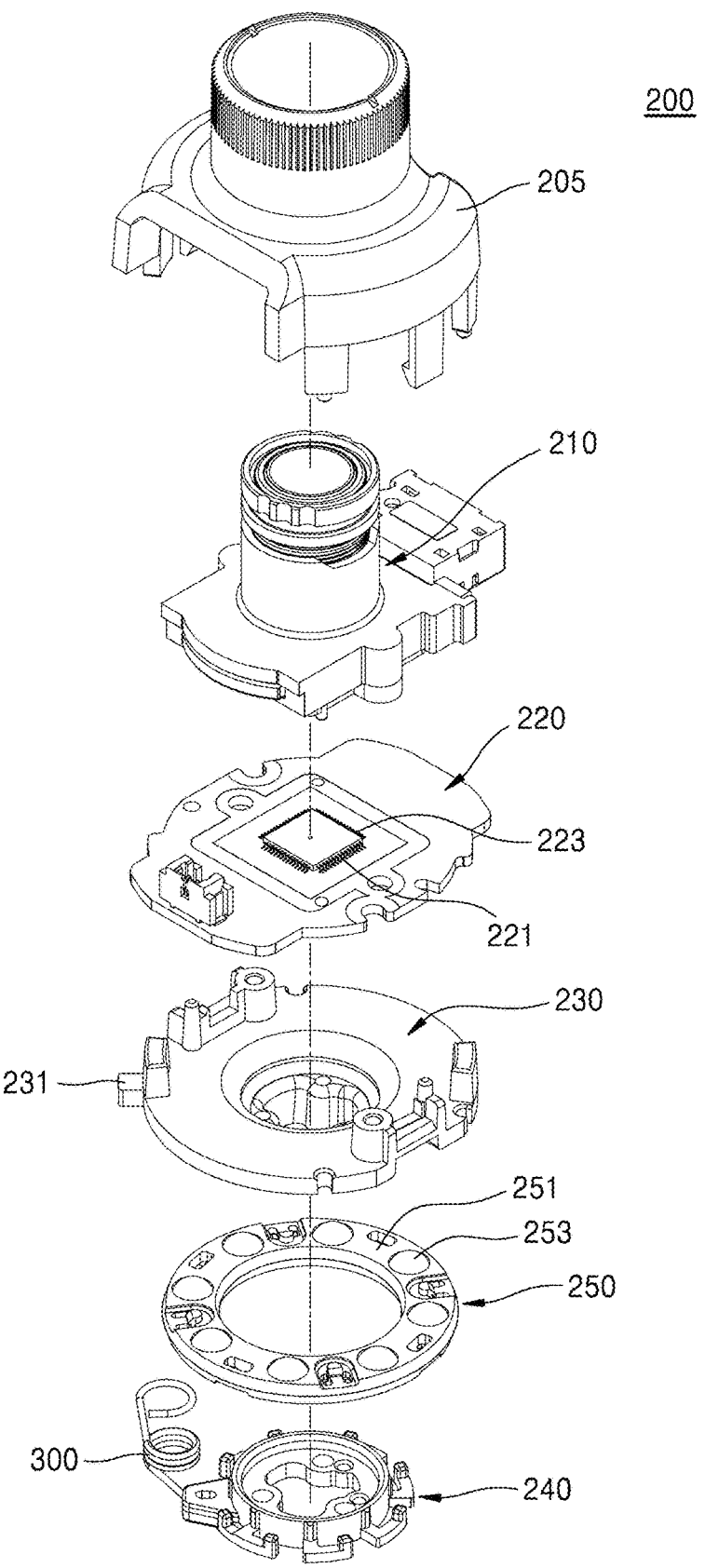
FIG. 5 is an exploded view illustrating a camera according to an embodiment.
Figure 6:
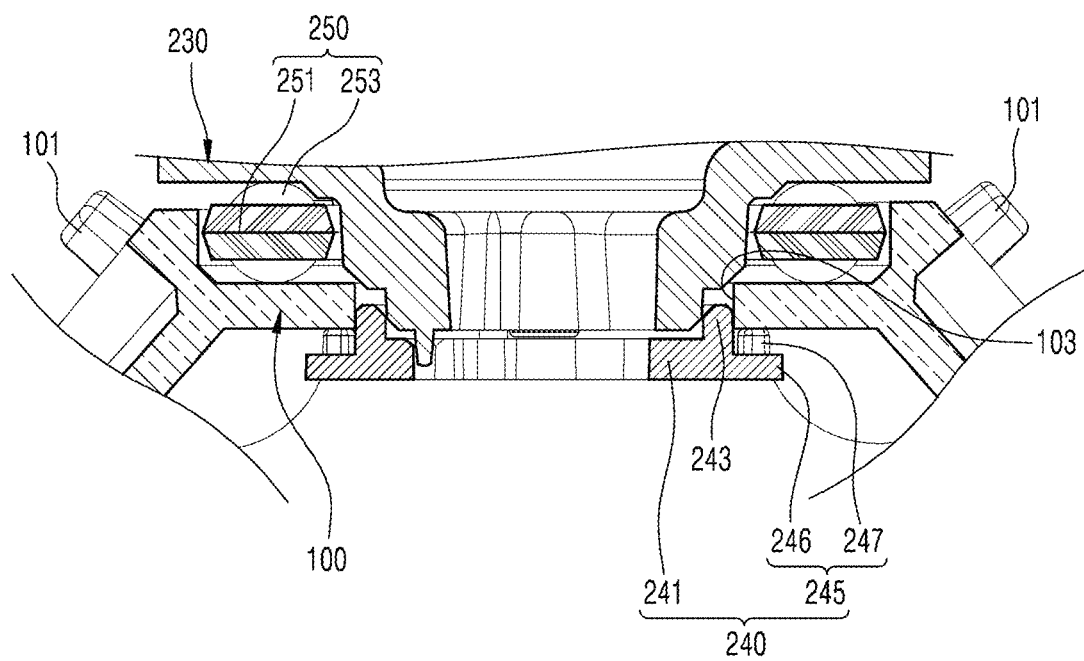
FIG. 6 is a front sectional view illustrating a portion A of FIG. 2.
Figure 7:
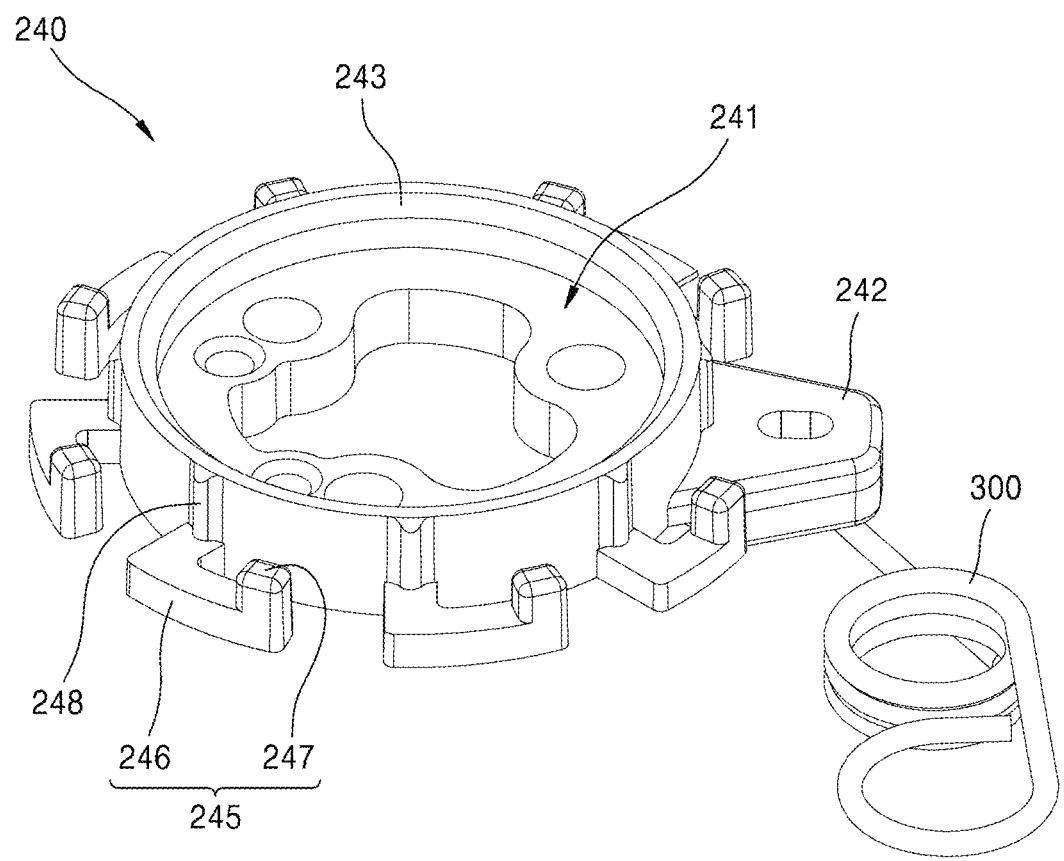
FIG. 7 is a perspective view illustrating a guide according to an embodiment.
Figure 8A:
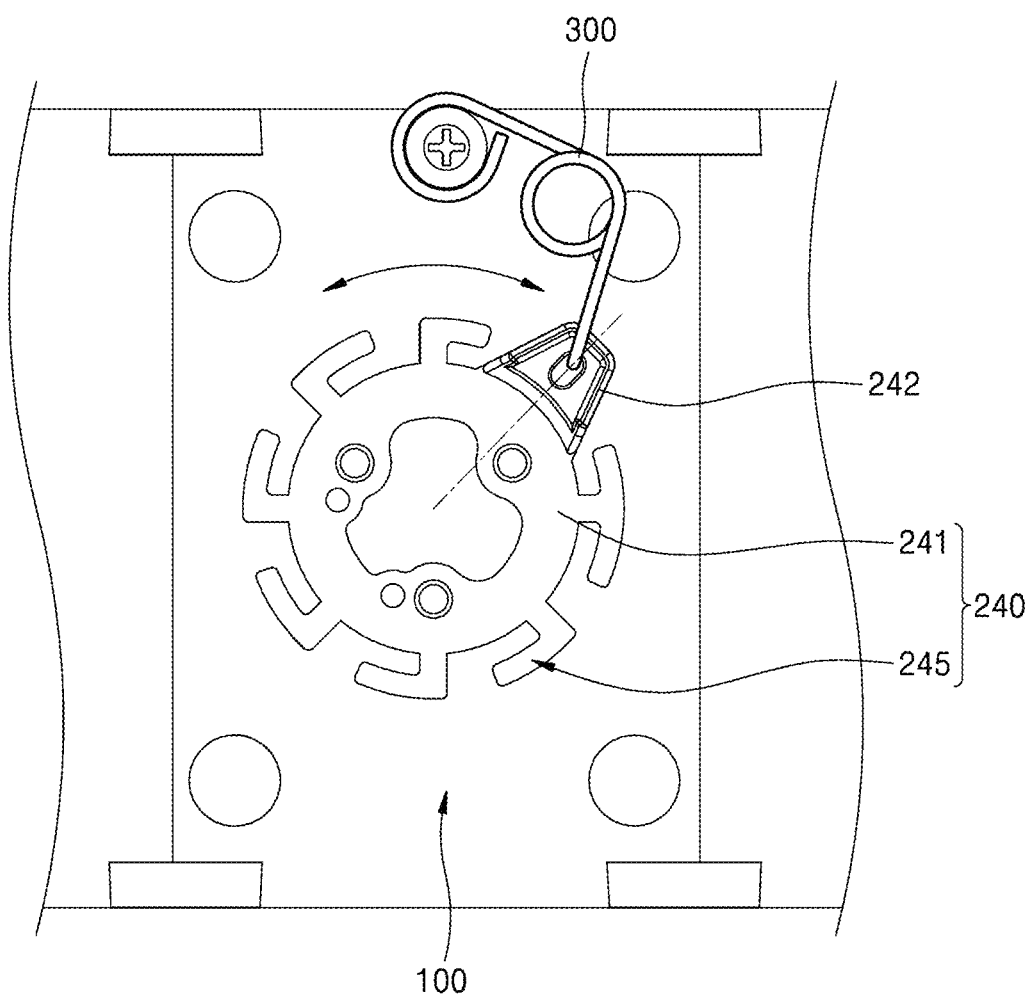
FIGS. 8A and 8B are views illustrating a state in which a guide rotates according to an embodiment.
Figure 8B:
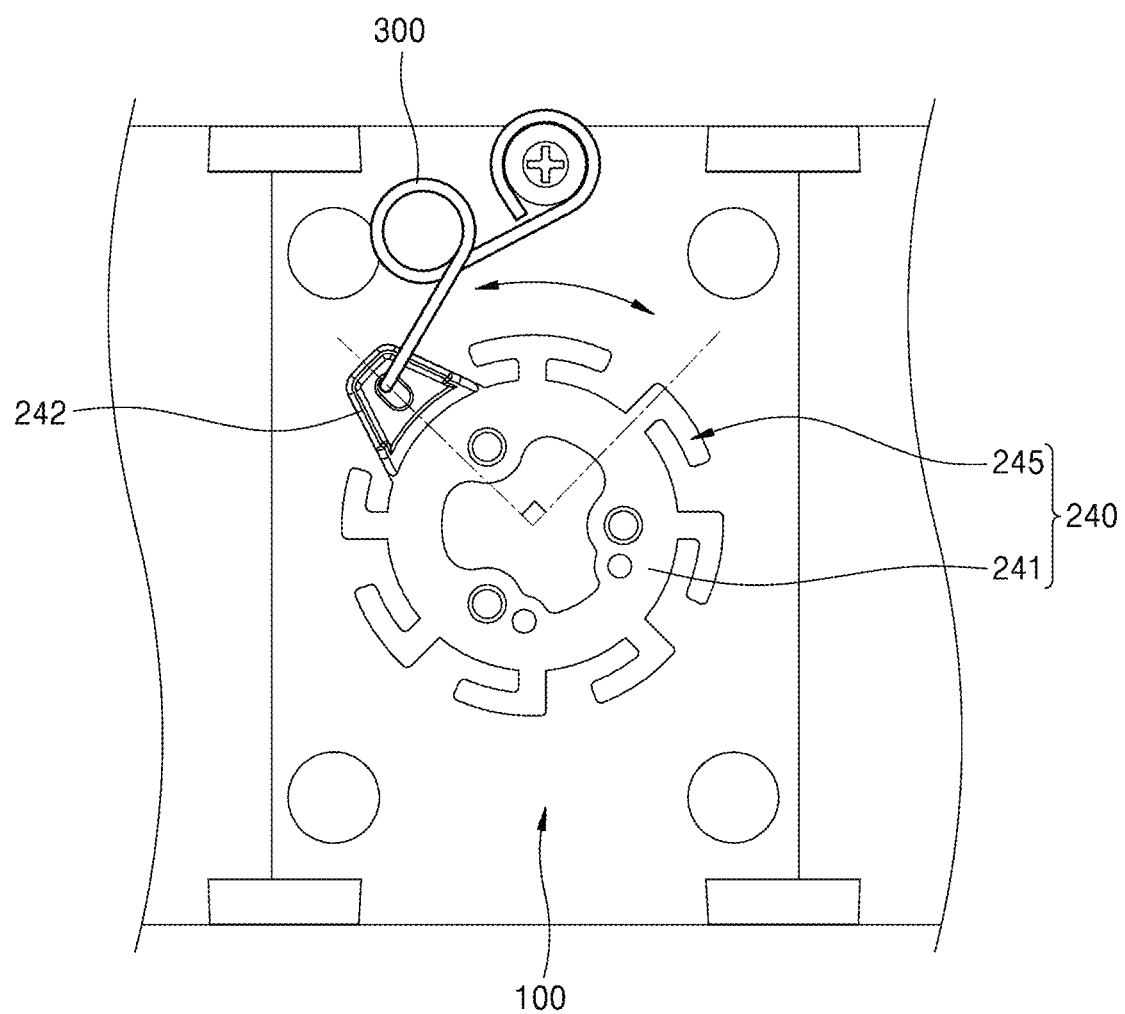

Embodiments will be described herein in detail with reference to the drawings. FIG. 1 is a perspective view of an imaging apparatus according to an embodiment. FIGS. 2 and 3 are perspective views illustrating a frame and a plurality of cameras according to an embodiment. FIG. 4 is a perspective view illustrating a camera according to an embodiment. FIG. 5 is an exploded view illustrating a camera according to an embodiment. FIG. 6 is a front sectional view illustrating a portion A of FIG. 2. FIG. 7 is a perspective view illustrating a guide according to an embodiment. FIGS. 8A and 8B are views illustrating a state in which a guide rotates according to an embodiment.

Referring to FIGS. 1 through 7, an imaging apparatus 1 according to an embodiment may include a frame 100, at least one camera 200, and an elastic member 300.

Referring to FIGS. 1 through 3, the frame 100 on which a plurality of cameras 200 are provided may be provided in a case 5 to be rotatable in up, down, left, and right directions (see FIG. 1).

As the frame 100 rotates or moves inside the case 5, the cameras 200 provided on the frame 100 may face an object to be photographed and may capture an image of the object.

Although four cameras 200 are provided on the frame 100, the inventive concept is not limited thereto, and various modifications may be made; for example, a different number of cameras 200 may be provided on the frame 100 according to a purpose of the imaging apparatus 1.

Referring to FIGS. 2, 4, and 5, a frame stopper 101 may protrude outward from a surface of the frame 100 according to an embodiment. The frame stopper 101 may be located on a movement path of a base stopper 231 formed on a base 230.

Accordingly, when the base 230 to which a sensor 220 and a lens 210 are coupled receives external power and rotates on the frame 100, the base 230 may contact the frame stopper 101 located on the movement path of the base stopper 231, so that the base 230 with the sensor 220 and the lens 210 coupled to and moving along with the base 230 rotate only by a pre-set angle.

A plurality of frame stoppers 101 may be provided at both target points of the base 230 when the base 230 rotates clockwise or counterclockwise by a preset angle, for example, 90°.

Referring to FIGS. 3 and 6, a frame groove 103 concentric with a central axis of rotation of the base 230 may be formed in the frame 100 according to an embodiment. The frame groove 103 may have a groove shape in a vertical direction (see FIG. 6), and may contact a guide well 243 formed in a guide 240.

Referring to FIG. 6, an outer diameter of the guide well 243 is less than an inner diameter of the frame groove 103, and an outer circumferential surface of the guide well 243 contacts an inner circumferential surface of the frame groove 103.

Accordingly, when the guide 240 rotates clockwise or counterclockwise by a preset angle, for example 90°, about a central axis of rotation, the central axis of rotation of the guide 240 is not tilted; in other words, when the base 230 connected to the guide 240 rotates clockwise or counterclockwise about the central axis of rotation, the central axis of rotation does not rotate and is kept constant.

Referring to FIG. 6, a guide contact 245 coupled to the guide 240, preferably but not necessarily, a guide body 241, contacts a bottom surface (see FIG. 6) of the frame 100. A plurality of guide contacts 245 may be provided, and may be spaced apart from one another along the guide body 241 about the center of the guide body 241.

Referring to FIGS. 3 and 6, because the plurality of guide contacts 245 formed on the guide 240 connected to the base 230, preferably but not necessarily, on the guide body 241, contact the bottom surface of the frame 100 (see FIG. 6) when the base 230 receives external power and rotates on the frame 100, the center of rotation of the base 230 and the sensor 220 and the lens 210 coupled to the base 230 is maintained when the base 230 rotates.

Referring to FIGS. 1 through 7, the camera 200 according to an embodiment may be provided on the frame 100, and may include a cover 205, the lens 210, the sensor 220, the base 230, the guide 240, and a support 250.

Referring to FIGS. 1 through 3, a plurality of cameras 200 may be provided, and four cameras (i.e., first through fourth cameras 200A, 200B, 200C, and 200D) may be provided on the frame 100. However, the inventive concept is not limited thereto, and various modifications may be made; for example, one camera may be provided or five cameras may be provided.

Referring to FIGS. 4 and 5, the cover 205 may be coupled to the lens 210, and may protect the exterior of the lens 210 and may reduce external impact.

Referring to FIGS. 1 through 5, the lens 210 is coupled to the cover 205 and the base 230, and converges or diverges light received from the object to be photographed and forms an optical image. The sensor 220 is provided inside the lens 210.

Referring to FIGS. 1 through 5, the sensor 220 according to an embodiment may be coupled to the lens 210 and the base 230, and may obtain an image. The sensor 220 may include a long side 221 and a short side 223 that is shorter than the long side 221 in length, and the long side 221 and the short side 223 may be formed at a ratio of 4:3 or 16:9 instead of 1:1.

Figure 9A:
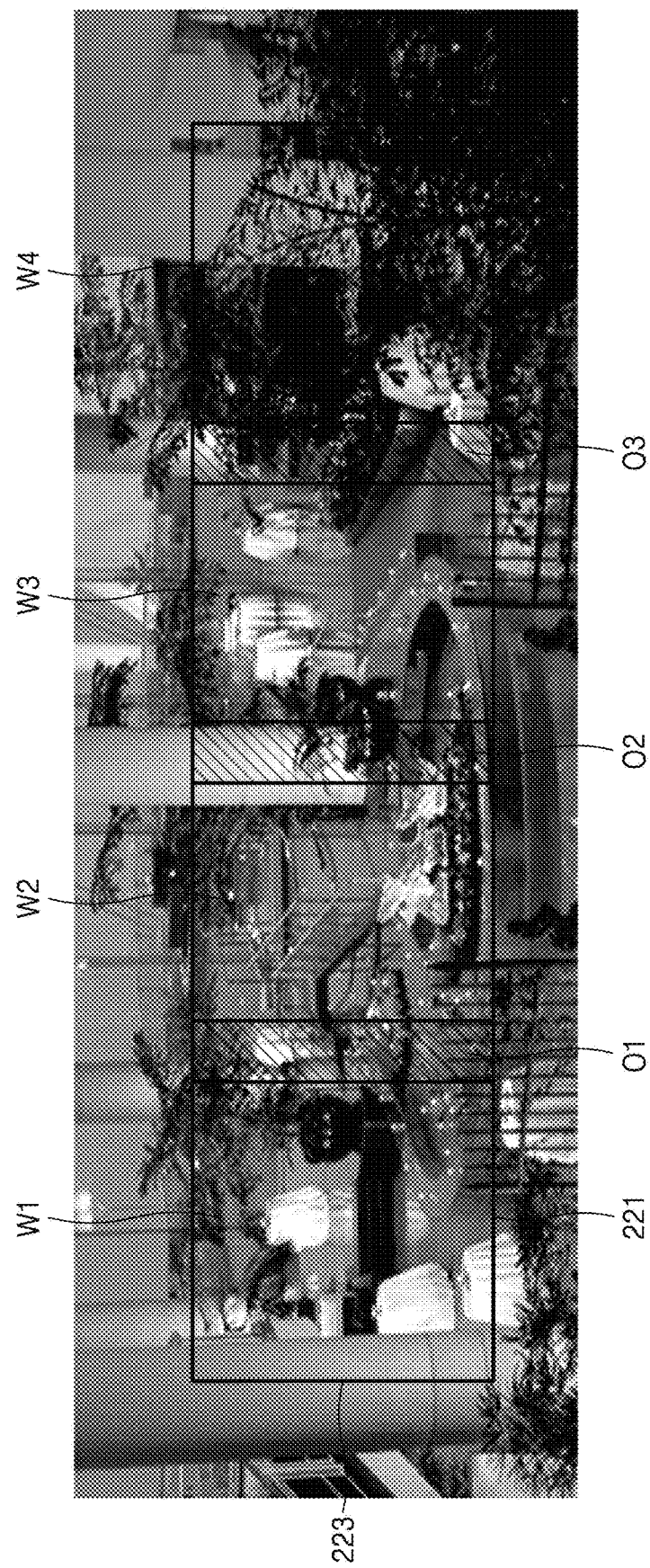
FIGS. 9A and 9B are views illustrating an image acquisition area according to a photographing mode according to an embodiment.
Figure 9B:
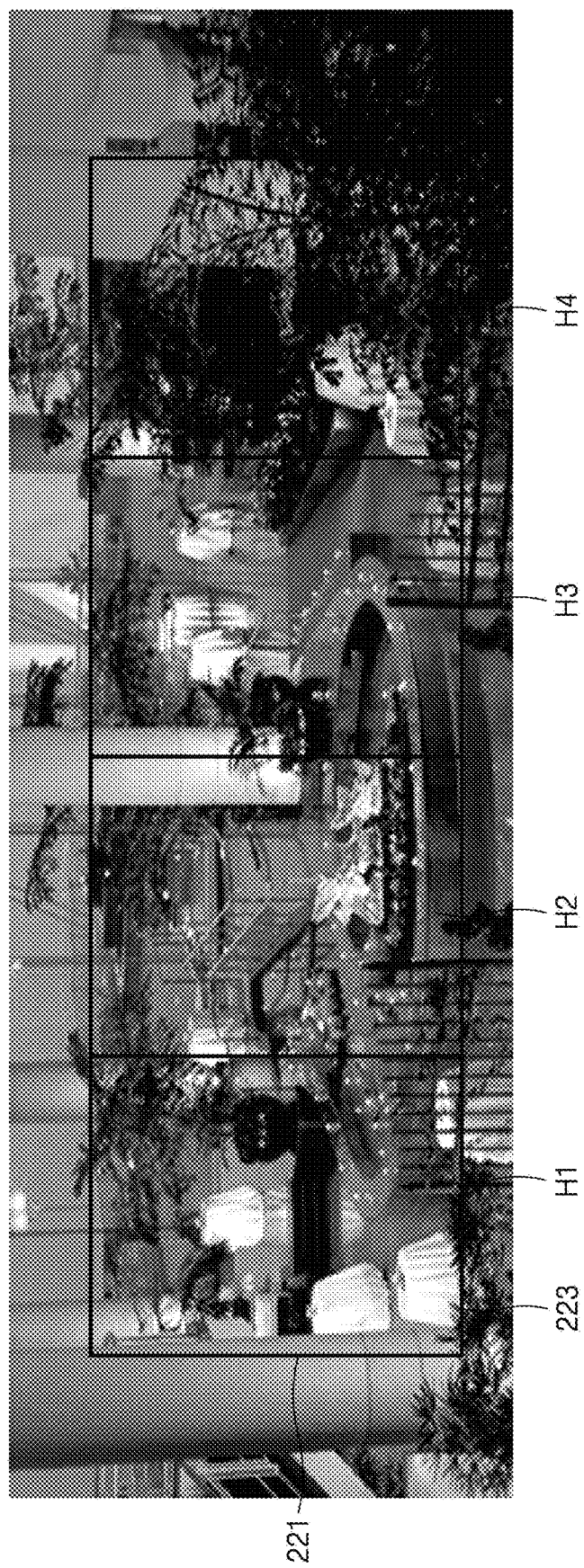

Referring to FIGS. 9A and 9B, a user may set a horizontal mode or a vertical mode according to a photographing purpose and an object of photographing. In the horizontal mode, a first horizontal area W1, a second horizontal area W2, a third horizontal area W3, and a fourth horizontal area W4 are respectively photographed by the first camera 200A, the second camera 200B, the third camera 200C, and the fourth camera 200D. Here, the first through fourth horizontal areas W1 through W4 may form a panoramic image.

In the vertical mode, a first vertical area H1, a second vertical area H2, a third vertical area H3, and a fourth vertical area H4 are respectively photographed by the first camera 200A, the second camera 200B, the third camera 200C, and the fourth camera 200D. Here, the first through fourth vertical areas H1 through H4 may form a panoramic image.

Referring to FIG. 9A, when the horizontal mode is set in the imaging apparatus 1 according to an embodiment, the long side 221 may be horizontally located (left-right direction of FIG. 9A) on a captured image and the short side 223 may be vertically located (up-down direction of FIG. 9A) on the captured image, and a horizontally larger image (see FIG. 9A) than that in the vertical mode may be obtained.

Referring to FIG. 9B, when the vertical mode is set in the imaging apparatus 1 according to an embodiment, the long side 221 may be vertically located (up-down direction of FIG. 9B) on a captured image and the short side 223 may be horizontally located (left-right direction of FIG. 9B) on the captured image, and a vertically larger image (see FIG. 9B) than that in the horizontal mode may be obtained. This is because an aspect ratio of the sensor 220 is changed between the horizontal mode and the vertical mode.

The sensor 220 may include an imaging device (not shown) such as a charge-coupled device (CCD), and may photograph or monitor an object. Although the imaging apparatus 1 according to an embodiment is a dome surveillance camera, the inventive concept is not limited thereto, and various modifications may be made; for example, the imaging apparatus 1 may be any of cameras other than the dome camera.

Referring to FIGS. 2 through 5, the base 230 according to an embodiment may be coupled to the sensor 220, may receive external power, and may be rotatable on the frame 100.

A driver (not shown) may be provided on the frame 100 or the base 230, and the base 230 may receive power from the driver that receives external power and may rotate on the frame 100 clockwise or counterclockwise.

The base 230 according to an embodiment may be coupled to the sensor 220, the lens 210, and the cover 205, and as the base 230 receives power and rotates, the sensor 220, the lens 210, and the cover 205 may rotate clockwise or counterclockwise by a preset angle.

In detail, although the base 230 rotates clockwise or counterclockwise by a preset angle, for example, 90°, in an embodiment, the inventive concept is not limited thereto, and various modifications may be made according to the user's settings, for example, 45° or 135°.

Referring to FIGS. 8A and 8B, the base 230 may rotate clockwise or counterclockwise (see FIG. 9A) about the central axis of rotation within a preset angle, and as the base 230 rotates on the frame 100, the sensor 220 and the lens 210 may rotate and a photographing mode may change to the horizontal mode or the vertical mode.

Referring to FIGS. 2, 4, and 5, the base stopper 231 may protrude from a surface of the base 230 according to an embodiment. As the base 230 rotates, the base stopper 231 rotates clockwise or counterclockwise by a preset angle.

As the base stopper 231 rotates, the base stopper 231 may contact the frame stopper 101 located on a rotation path of the base stopper 231, so that the frame stopper 101 prevents the base 230 from rotating beyond a preset angle.

Referring to FIGS. 3 through 7, the guide 240 according to an embodiment that is connected to the base 230 and is rotatable may contact the frame 100, and may prevent the central axis of rotation of the base 230 from being moved when the base 230 rotates.

Referring to FIG. 7, the guide 240 according to an embodiment may include the guide body 241, the guide contact 245, and a guide rib 248.

Referring to FIGS. 3, 4, 6, and 7, the guide body 241 according to an embodiment that is connected to the base 230 may be engaged with the base 230, and may rotate together. The guide body 241 may share the central axis of rotation with the base 230 and may rotate as the base 230 rotates.

Referring to FIGS. 4 and 7, a protrusion 242 may be formed on a side of the guide 240, and the elastic member 300 may be connected to the protrusion 242.

In detail, the protrusion 242 may protrude in a circumferential direction from an outer circumferential surface of the guide body 241, and the elastic member 300 may be caught by the protrusion 242.

Although one protrusion 242 is formed, the inventive concept is not limited thereto, and various modifications may be made; for example, a plurality of protrusions 242 may be formed and one or more elastic members 300 may be connected to the protrusions 242.

Referring to FIGS. 6 and 7, the guide well 243 may protrude from the circumference of the guide body 241 according to an embodiment. The guide well 243 may protrude upward from the guide body 241 (see FIG. 6) and may have a cylindrical shape whose top and bottom are open (see FIG. 6).

An outer surface of the guide well 243 may contact an inner surface of the frame groove 103 formed in the frame 100 along the circumference of the guide well 243.

Accordingly, as the base 230 rotates and the guide 240 rotates, the central axis of rotation of the guide 240 and the central axis of rotation of the base 230 connected to the guide 240 may be prevented from being tilted due to the guide well 243 during clockwise or counterclockwise rotation by a preset angle.

Although the guide well 243 is continuously formed along the circumference of the guide body 241, the inventive concept is not limited thereto, and various modifications may be made; for example, the guide well 243 is open in a preset section.

Referring to FIGS. 4, 6, and 7, the guide contact 245 according to an embodiment that is coupled to the guide body 241 may be coupled to an outer circumferential surface of the guide body 241 to protrude away from the center of the guide body 241.

Various modifications may be made; for example, the guide contact 245 according to an embodiment may be integrally formed with the guide body 241 or may be formed as a separate member. A plurality of guide contacts 245 may be provided, and the plurality of guide contacts 245 may be arranged at regular intervals along the outer circumferential surface of the guide body 241.

Referring to FIGS. 6 and 7, the guide contact 245 according to an embodiment may include a contact body 246.

The contact body 246 that is coupled to the guide body 241 may be coupled to the outer circumferential surface of the guide body 241 to be spaced apart from the center of the guide body 241.

A contact protrusion 247 may be formed on the contact body 246 and may protrude upward (see FIG. 6). The contact protrusion 247 may be perpendicular to the contact body 246.

Referring to FIG. 6, the contact protrusion 247 contacts a surface (bottom surface in FIG. 6) of the frame 100. A plurality of guide contacts 245, specifically, contact bodies 246, may be provided, and as the plurality of contact bodies 246 are provided, the contact protrusions 247 corresponding to the contact bodies 246 may respectively protrude from the contact bodies 246.

Because the plurality of guide contacts 245, preferably but not necessarily, the contact protrusions 247, that are uniformly arranged are in contact (e.g., point contact or surface contact) with the frame 100, when the sensor 220, the lens 210, and the cover 205 coupled to the base 230 rotate according to the rotation of the base 230, the central axis of rotation of the base 230 may be kept constant and may be prevented from being tilted.

Referring to FIG. 7, because the guide rib 248 according to an embodiment contacts both the guide body 241 and the guide contact 245 and is provided at a connected portion between the guide body 241 and the guide contact portion 245, a coupling force between the guide body 241 and the guide contact 245 may be increased and rigidity may be ensured.

Although the guide rib 248 is formed as a separate member and is coupled to the guide body 241 and the guide contact 245, the inventive concept is not limited thereto and, and various modifications may be made; for example, the guide rib 248 may be integrally formed with the guide body 241 and the guide contact 245, and may be formed on the connected portion between the guide contact 245 and the guide body 241.

Referring to FIGS. 4 through 6, the support 250 according to an embodiment may be located between the frame 100 and the base 230 and may contact the frame 100 and the base 230.

Referring to FIG. 6, the support 250 may be provided in the frame groove 103 formed in the frame 100 to be engaged with the base 230. Accordingly, the top of the support 250 (see FIG. 6) may contact the base 230, and the bottom of the support 250 (see FIG. 6) may contact the frame 100.

The support 250 according to an embodiment may include a support plate 251 and a bearing 253.

The support plate 251 may be concentric with the base 230 and the guide 240, and the bearing 253 may be provided on the support plate 251. A plurality of bearings 253 may be provided on the support plate 251.

The plurality of bearings 253 may be arranged at a regular interval about the center of the support plate 251.

Referring to FIGS. 4 through 6, the bearing 253 according to an embodiment may be a ball bearing. The top of the bearing 253 (see FIG. 6) contacts the base 230 and the bottom of the bearing 253 (see FIG. 6) contacts the frame 100, preferably but not necessarily, the frame groove 103.

Referring to FIG. 6, because the bearing 253 may be a ball bearing, the bearing 253 may be in point contact with the base 230 and the frame 100, and due to the plurality of bearings 253, a balance between the base 230 and the frame 100 may be maintained, friction may be minimized, and the rotation of the base 230 may be supported.

In addition, because friction between the bearing 253 and the base 230 is minimized, smooth rotation due to an elastic restoring force of the elastic member 300 coupled to the guide 240 may be achieved.

In addition, the base 230 connected to the guide 240 may rotate on the frame 100 in a balanced manner.

Referring to FIGS. 4 and 5, a plurality of bearings 253 according to an embodiment may be provided, and the plurality of bearings 253 may be arranged at a regular interval about the center of the support plate 251, to uniformly distribute and support an axial load of the base 230.

Referring to FIGS. 4 through 6, in the imaging apparatus 1 according to an embodiment, although the support 250 is located between the base 230 and the frame 100, and the guide 240 is located under the frame 100 (see FIG. 6), the inventive concept is not limited thereto; and although not shown in FIGS. 4 through 6, the guide 240 may be located between the base 230 and the frame 100 and the support 250, that is, the bearing 253, may be located under the frame 100 (see FIG. 6).

In addition, various modifications may be made; for example, the support 250, preferably but not necessarily, the bearing 253, may be located both over and under the frame 100, or the guide 240 may be located both over and under the frame 100.

However, the inventive concept is not limited thereto, and various modifications may be made; for example, the support 250 may include a wave washer-type leaf spring.

Due to the support 250, positional deviation, that is, height deviation, eccentricity of the central axis of rotation, or distortion, between the frame 100 and the base 230 along the central axis of rotation, which occurs as the base 230 provided on the frame 100 rotates, may be prevented.

Referring to FIGS. 3 through 5 and 7, the elastic member 300 according to an embodiment may be formed of an elastic material, and may be coupled to the frame 100 and the guide 240. The elastic member 300 may include a coil spring, specifically, a torsion spring having a coil shape, and various modifications may be made; for example, the elastic member 300 may include a pin spring.

Referring to FIGS. 3, 8A, and 8B, one end of the elastic member 300 according to an embodiment may be fixed to a preset point of the frame 100, and the other end of the elastic member 300 may be fixed to a preset portion of the guide 240, preferably but not necessarily, the protrusion 242 formed on the guide body 241.

Referring to FIGS. 8A and 8B, as the base 230 rotates by a preset angle, the guide 240 connected to the base 230, specifically, the guide body 241, rotates. In this case, the one end of the elastic member 300 is fixed to the preset point of the frame 100 corresponding to the center of a radius of rotation of the guide body 241, and the other end of the elastic member 300 is fixed to the protrusion 242 formed on the guide body 241.

Accordingly, at both ends of the radius of rotation of the base 230, that is, both ends of the radius of rotation of the guide body 241 corresponding to a plurality of points where the base stopper 231 and the frame stopper 101 contact, positions of the base 230 and the guide body 241 connected to the base 230 may be fixed due to an elastic restoring force of the elastic member 300.

In addition, when a photographing mode corresponding to both ends of the radius of rotation of the base 230 and the guide body 241 connected to the base 230 repeatedly changes between the horizontal mode and the vertical mode, accurate positions may be fixed and position representation may be improved.

In addition, when a photographing mode changes from the vertical mode to the horizontal mode, stitching performance and quality of matching overlapping images, specifically, a first overlapping area O1 that is an overlapping area between the first camera 200A and the second camera 200B, a second overlapping area O2 that is an overlapping area between the second camera 200B and the third camera 200C, and a third overlapping area O3 that is an overlapping area between the third camera 200C and the fourth camera 200D may be improved.

The operation principle and effect of the imaging apparatus 1 according to an embodiment will be described. FIGS. 9A and 9B are views illustrating an image acquisition area according to a photographing mode.

Referring to FIGS. 1 through 9B, the imaging apparatus 1 according to an embodiment may include the frame 100, the camera 200, and the elastic member 300. The frame 100, the camera 200, and the elastic member 300 may be provided in the case 5, and the base 230 may receive external power and may rotate on the frame 100.

Referring to FIGS. 9A and 9B, the user may set a photographing mode to the horizontal mode in which a horizontal length (see FIG. 9A) is greater than a vertical length or the vertical mode in which a horizontal length (see FIG. 9B) is less than a vertical length according to a purpose of photographing an object by using the imaging apparatus 1.

Accordingly, a controller (not shown) may transmit an electrical signal to a driver (not shown) connected to the base 230, and the driver may transmit power to the base 230 and may rotate the base 230.

Referring to FIGS. 4 and 5, the base 230 is coupled to the lens 210, the sensor 220, and the guide 240, receives power from the driver, and rotates by a preset angle.

Referring to FIGS. 8A and 8B illustrating a surface of the frame 100 opposite to a surface of the frame 100 on which the base 230, the lens 210, the cover 205, and the sensor 220 are provided, the guide 240 is connected to the base 230 and rotates as the base 230 rotates.

Because the guide 240 shares the central axis of rotation with the base 230 and is connected to the base 230, when the base 230 rotates, the guide 240 may also rotate on the frame 100.

Referring to FIG. 8A, the base 230 and the guide 240 connected to the base 230 are located at positions corresponding to the horizontal mode (or the vertical mode) on the frame 100, and referring to FIG. 8B, the base 230 and the guide 240 connected to the base 230 rotate and are located at positions corresponding to the vertical mode (or the horizontal mode) on the frame 100.

Referring to FIGS. 3, 8A, and 8B, the base 230, and the lens 210, the sensor 220, and the guide 240 connected to the base 230 may rotate by a preset angle, for example, 90°, so that the frame stopper 101 and the base stopper 231 contact each other, and positions of the base 230 and the guide 240 connected to the base 230 may be fixed without being changed due to an elastic restoring force of the elastic member 300.

In addition, position representation according to a repeated change of a photographing mode between the horizontal mode and the vertical mode may be improved, and thus, in particular, the efficiency of a stitching operation of matching overlapping of images obtained by the sensor 220 in the horizontal mode may be improved.

Referring to FIGS. 6 and 7, because an outer circumferential surface of the guide well 243 formed on the guide 240, preferably but not necessarily, the guide body 241, contacts an inner circumferential surface of the frame groove 103, the central axis of rotation may be prevented from being distorted when the base 230 rotates.

In addition, because at least one guide contact 245, preferably but not necessarily, contact protrusion 247, is in contact (e.g., surface contact or point contact) with a surface (bottom surface of FIG. 6) of the frame 100, and a plurality of contact protrusions 247 uniformly contact the frame 100, when the base 230 and the guide 240 connected to the base 230 rotate, the central axis of rotation of the base 230 and the lens 210 and the sensor 220 coupled to the base 230 may be prevented from being distorted.

In other words, position representation may be improved when a mode repeatedly changes between the horizontal mode and the vertical mode, positions may be fixed due to an elastic restoring force of the elastic member 300 at locations corresponding to the horizontal mode and the vertical mode, and stitching performance of matching overlapping portions of images may be improved.

Referring to FIGS. 4 through 6, due to the support 250, height deviation between the base 230 and the frame 100 may be prevented, the rotation of the base 230 and the lens 210, the sensor 220, and the guide 240 connected to the base 230 may be supported, and eccentricity and distortion of the central axis of rotation of the base 230 may be prevented.

According to the one or more embodiments, because a guide to which a base is connected contacts a frame, a central axis of rotation may be prevented from being moved when the base rotates.

Also, due to an elastic member, a position of the base is fixed when a photographing mode changes, and position representation and stitching performance may be improved.

Also, due to a support member, positional deviation between the base and the frame along the central axis of rotation may be prevented, and the rotation of the base and a lens, a sensor, and the guide connected to the base may be supported.

It should be understood that the embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the inventive concept as defined by the following claims.

What is claimed is:

1. An imaging apparatus comprising:
   a frame; and
   at least one camera provided on the frame,
   wherein each of the at least one camera comprises:
   a lens;
   a sensor coupled to the lens and configured to obtain an image;
   a base coupled to the sensor or the lens, configured to receive external power, and rotatable on the frame; and
   a guide connected to the base to be rotatable along with the base, and contacting the frame,
   wherein the guide includes a guide body sharing a central axis of rotation with the base and connected to the base, the guide being provided parallel to the base.

2. The imaging apparatus of claim 1, wherein the base is rotatable within a preset angle, and in response to the base rotating, the sensor and the lens are configured to rotate to change a photographing mode between a plurality of different modes.

3. The imaging apparatus of claim 2, further comprising an elastic member comprising an elastic material and coupled to each of the frame and the guide.

4. The imaging apparatus of claim 3, wherein the elastic member comprises a torsion spring having a coil shape.

5. The imaging apparatus of claim 3, wherein a protrusion protrudes from an outer circumferential surface of the guide, and
   wherein the elastic member is caught by the protrusion.

6. The imaging apparatus of claim 1, wherein the guide further comprises:
   a guide contact coupled to an outer surface of the guide body to protrude outward and contacting the frame.

7. The imaging apparatus of claim 6, wherein the guide further comprises a guide well coupled to an outer surface of the base.

8. The imaging apparatus of claim 6, further comprising a support located between the base and the frame, and contacting the base and the frame.

9. The imaging apparatus of claim 8, wherein the support comprises:
   a support plate located between the base and the frame; and
   a bearing provided on the support plate and contacting the base and the frame.

10. The imaging apparatus of claim 9, wherein the bearing comprises a ball bearing.

11. The imaging apparatus of claim 10, wherein one side of the bearing is in point contact with a surface of the base, and the other side of the bearing is in point contact with a surface of the frame.

12. The imaging apparatus of claim 1, further comprising a support located between the guide and the frame and contacting the guide and the frame.

13. The imaging apparatus of claim 12, wherein the support comprises:
   a support plate located between the guide and the frame; and
   a bearing provided on the support plate, and
   wherein one side of the bearing is in point contact with a surface of the guide, and the other side of the bearing is in point contact with a surface of the frame.

14. The imaging apparatus of claim 1, wherein the at least one camera comprises a plurality of cameras, wherein the cameras are attached to the frame to be directed to different directions,
   wherein the base of each of the cameras is rotatable within a corresponding preset angle, and in response to the base rotating, the lens of the each of the cameras is configured to rotate to change a photographing mode between different modes, and
   wherein the different modes have different aspect ratios with regard to the sensor.

15. An imaging apparatus comprising:
   a frame; and
   at least one camera provided on the frame,
   wherein each of the at least one camera comprises:
   a lens;
   a sensor coupled to the lens and configured to obtain an image;
   a base coupled to the sensor or the lens, configured to receive external power, and rotatable on the frame; and
   a guide connected to the base to be rotatable along with the base, and contacting the frame,
   wherein the base is rotatable within a preset angle, and in response to the base rotating, the sensor and the lens are configured to rotate to change a photographing mode between a plurality of different modes, and
   wherein the different modes comprise a first mode, in which a horizontal length of the image is greater than a vertical length of the image, and a second mode in which the horizontal length of the image is smaller than the vertical length of the image.

16. An imaging apparatus comprising:
   a frame; and
   at least one camera provided on the frame,
   wherein each of the at least one camera comprises:
   a lens;
   a sensor coupled to the lens and configured to obtain an image; and
   a base to which the sensor or the lens is coupled, and
   wherein the base is configured to rotate on the frame by a preset angle to change a photographing mode between a plurality of different modes in which an aspect ratio of the sensor is different.

17. The imaging apparatus of claim 16, wherein the frame comprises at least one frame stopper formed thereon configured to control rotation of the base by the preset angle.

18. The imaging apparatus of claim 16, further comprising:
   a guide engaged with the base and contacting the frame; and
   an elastic member coupled to the frame and the guide to control the rotation of the base by the preset angle.

19. The imaging apparatus of claim 18, further comprising at least one bearing located between the guide and the frame and contacting the guide and the frame.

20. The imaging apparatus of claim 16, wherein the at least one camera comprises a plurality of cameras configured to capture a plurality of images, respectively using respective lenses, comprising the lens, and respective sensors comprising the sensor, and
   wherein the images captured by the respective sensors form a panoramic image.

* * * * *